UNITED STATES PATENT OFFICE.

WILLIAM FREDERICK KEATING STOCK, OF DARLINGTON, ENGLAND.

FERTILIZER, INSECTICIDE, AND FUNGICIDE.

1,003,541. Specification of Letters Patent. Patented Sept. 19, 1911.

No Drawing. Application filed March 31, 1911. Serial No. 618,065.

*To all whom it may concern:*

Be it known that I, WILLIAM FREDERICK KEATING STOCK, a subject of the King of Great Britain, of 9 Houndgate, Darlington, in the county of Durham, England, have invented a certain new and Improved Fertilizer, Insecticide, and Fungicide, of which the following is a specification.

The present invention relates to a compound suitable for use as a fertilizer, insecticide, and fungicide and consists in properly combining certain substances which will be hereinafter described in a manner so as to obtain effects in the use of the material not heretofore known in connection with the use of any one of the component ingredients.

The improved compound consists of spent oxid, a by-product of the purification of coal gas, carbon waste, which is produced when certain alkaline liquors obtained in the manufacture of paper are treated for the recovery of alkali, and crude drained naphthalene, a product of the distillation of coal and coal tar.

It is well known that when coal gas is purified from sulfur by means of oxid of iron, sulfid of iron is formed until the power of the iron oxid to absorb sulfur ceases, and the spent oxid is removed from the purifier and exposed to the action of air and moisture. Oxidation of the sulfid of iron is set up causing the separation of sulfur in the free state. While the present invention is not limited to the use of any one form of spent oxid, I may employ any spent oxid containing uncombined sulfur as above described.

The carbon waste, forming one of the ingredients of the compound constituting the present invention, is preferably that which is produced when the alkaline liquors which remain after boiling esparto grass or wood pulp with caustic soda are treated for the recovery of alkali. These alkaline liquors are usually evaporated in vacuum evaporators to a small bulk and the evaporated mass is transferred to a rotary furnace and fired, after which the charge is lixiviated with water for the removal of alkali, and the carbon waste is left as a black insoluble residue. The scope of the present invention is such however, that any carbon waste obtained by the action of heat upon cellulose may be used. These forms of carbon waste act as absorbents of naphthalene vapors and at the same time as deodorizers of the foul smelling gases arising from the spent oxid.

For general application, one part of spent oxid, one part of carbon waste, and one part of crude drained naphthalene are compounded in the manner hereinafter described, so that the resulting compound consists in $\frac{1}{3}$ of each ingredient, but these proportions may be varied to meet the special requirements.

When manufacturing the compound, the spent oxid and carbon waste are dried in a kiln or on a drying floor. They are then mixed with the crude drained naphthalene either by hand or by a suitable mechanical mixer. The mixture is next passed through a mill and ground to a condition in which it will pass through a sieve of suitable mesh (say from $\frac{1}{12}$ to $\frac{1}{4}$ inch).

The improved fertilizer, insecticide and fungicide which has been described may be used in several ways. It may be dug or plowed into the land before planting or sowing a crop. It may be applied as a top dressing, where a crop has been attacked either by grubs, caterpillars or flies. It may be used as a powder to be applied to plants in order to kill fungous growths, as in the case of mildew. The compound can also be applied to manure heaps during the accumulation of the same, in order to destroy insect larvæ and fungous growths.

I claim:

1. A compound capable of use as a fertilizer, insecticide and fungicide, consisting of spent oxid, carbon waste, and crude drained naphthalene.

2. A compound capable of use as a fertilizer, insecticide and fungicide, consisting of substantially one part spent oxid, one part carbon waste, and one part crude drained naphthalene.

3. A compound capable of use as a fertilizer, insecticide and fungicide, consisting of spent oxid of iron from gas works, carbon waste from alkaline liquors obtained in paper manufacture, and crude drained naphthalene.

4. A compound capable of use as a fertilizer, insecticide and fungicide, consisting of spent oxid of iron containing uncombined sulfur from gas works, carbon waste from the alkaline liquors obtained in the manufacture of paper, and crude drained naphthalene.

In testimony whereof I have hereunto set my hand in presence of two subscribing witnesses this 17th day of March 1911.

WILLIAM FREDERICK KEATING STOCK.

Witnesses:
THOMAS WILLIAM GUNTER,
WILLIAM SPENCER.

Copies of this patent may be obtained for five cents each, by addressing the "Commissioner of Patents, Washington, D. C."